(12) United States Patent
Mukherjee et al.

(10) Patent No.: US 12,463,731 B1
(45) Date of Patent: Nov. 4, 2025

(54) ACTIVE CABLE INTERFACE WITH HYBRID DIRECT DRIVE AND RE-TIMER INTEGRATION

(71) Applicant: Marvell Asia Pte Ltd, Singapore (SG)

(72) Inventors: Tonmoy Shankar Mukherjee, Camarillo, CA (US); Lenin Patra, Dublin, CA (US)

(73) Assignee: Marvell Asia Pte Ltd, Singapore (SG)

( * ) Notice: Subject to any disclaimer, the term of this patent is extended or adjusted under 35 U.S.C. 154(b) by 68 days.

(21) Appl. No.: 18/133,790

(22) Filed: Apr. 12, 2023

Related U.S. Application Data

(60) Provisional application No. 63/330,361, filed on Apr. 13, 2022.

(51) Int. Cl.
| | |
|---|---|
| *H04B 10/25* | (2013.01) |
| *H04B 3/06* | (2006.01) |
| *H04B 10/40* | (2013.01) |
| *H04B 10/50* | (2013.01) |
| *H04B 10/54* | (2013.01) |
| *H04B 10/69* | (2013.01) |
| *H04L 25/03* | (2006.01) |

(52) U.S. Cl.
CPC ............. *H04B 10/697* (2013.01); *H04B 3/06* (2013.01); *H04B 10/25* (2013.01); *H04B 10/40* (2013.01); *H04B 10/504* (2013.01); *H04B 10/541* (2013.01); *H04L 25/03019* (2013.01)

(58) Field of Classification Search
CPC ................................ H04B 10/25; H04B 10/40
See application file for complete search history.

(56) References Cited

U.S. PATENT DOCUMENTS

| | | | |
|---|---|---|---|
| 2014/0255037 A1* | 9/2014 | Shang ................ | H04B 10/5055 398/115 |
| 2016/0327816 A1* | 11/2016 | Nagarajan ............. | H01S 5/4087 |
| 2022/0321218 A1* | 10/2022 | Sun ....................... | H04B 10/541 |

* cited by examiner

*Primary Examiner* — Nathan M Cors

(57) ABSTRACT

Interface circuitry for an active cable includes a first active cable interface configured for coupling to a first end of the active cable, and a second active cable interface configured for coupling to a second end of the active cable. The first active cable interface includes first transmitter circuitry including linear driving circuitry or non-linear driving circuitry, and first receiver circuitry including linear receiving circuitry or non-linear receiving circuitry. The second active cable interface includes second transmitter circuitry including linear driving circuitry when first transmitter circuitry includes non-linear receiving circuitry, and non-linear driving circuitry when first transmitter circuitry includes linear receiving circuitry. The second receiver circuitry includes linear receiving circuitry when first receiver circuitry includes non-linear driving circuitry, and non-linear receiving circuitry when first receiver circuitry includes linear driving circuitry.

26 Claims, 8 Drawing Sheets

ACTIVE CABLE INTERFACE WITH HYBRID DIRECT DRIVE AND RE-TIMER INTEGRATION

CROSS REFERENCE TO RELATED APPLICATION

This disclosure claims the benefit of, commonly-assigned U.S. Provisional Patent Application No. 63/330,361, filed Apr. 13, 2022, which is hereby incorporated by reference herein in its entirety.

FIELD OF USE

This disclosure relates to improving signal quality and link reliability, while reducing the power consumption and cost of transporting signals (e.g., optical signals and electrical signals) through interface circuitry of an active cable, such as an active optical cable (AOC) and an active electrical cable (AEC). The signals may be transported between network node devices (e.g., network switches). More particularly, this disclosure relates to interfaces at each end of an active cable, where, for each direction of transmission, one of the transmit end and the receive end is linear and the other end is non-linear.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In signal communications, signals are transmitted over a cable medium such as an optical cable (i.e., fiber-optic cable) or an electrical cable (i.e., multi-core electrical cable). The signal may be subject to transmission impairments—e.g. due to crosstalk (caused by signal interference from another signal) and/or jitter (any deviation or displacement of the signal).

SUMMARY

In accordance with implementations of the subject matter of this disclosure, interface circuitry for an active cable includes a first active cable interface configured for coupling to a first end of the active cable, and a second active cable interface configured for coupling to a second end of the active cable, the first active cable interface including first transmitter circuitry including one of (a) linear driving circuitry for a signal, and (b) non-linear driving circuitry for a signal, and first receiver circuitry including one of (c) linear receiving circuitry for a signal, and (d) non-linear receiving circuitry for a signal, and the second active cable interface including second transmitter circuitry including (a) the linear driving circuitry for a signal when the first transmitter circuitry includes the non-linear receiving circuitry, and (b) the non-linear driving circuitry for a signal when the first transmitter circuitry includes the linear receiving circuitry, and second receiver circuitry including (c) the linear receiving circuitry for a signal when the first receiver circuitry includes the non-linear driving circuitry, and (d) the non-linear receiving circuitry for a signal when the first receiver circuitry includes the linear driving circuitry.

In a first implementation of such interface circuitry, the linear driving circuitry for a signal may include a continuous time linear equalizer (CTLE) to perform continuous time linear equalization of the signal.

In a second implementation of such interface circuitry, the signal may be an electrical signal, and the active cable may be an active electrical cable.

In a third implementation of such interface circuitry, the signal may be an optical signal, and the active cable may be an active optical cable.

According to a first aspect of that third implementation, the linear driving circuitry for the signal may include any one of (a) a vertical-cavity surface-emitting laser (VCSEL) driver, (b) an electro-absorption modulated laser (EML) driver, (c) a directly modulated laser (DML) driver, (d) a silicon photonics (SiPho) driver, (e) a micro-ring resonator, and (f) a micro light-emitting diode (LED) driver.

According to a second aspect of that third implementation, the linear receiver circuitry for a signal may include a high-swing transimpedance amplifier (TIA) to amplify the optical signal.

In a fourth implementation of such interface circuitry, the linear driving circuitry for a signal may be configured to encode signals using one of (a) non-return-to-zero (NRZ) encoding and (b) pulse amplitude modulation (PAM) encoding.

In a fifth implementation of such interface circuitry, the linear receiver circuitry for a signal may include a continuous time linear equalizer (CTLE) to perform continuous time linear equalization of the signal.

In a sixth implementation of such interface circuitry, the non-linear driving circuitry for a signal may include a first digital signal processor, and the non-linear receiving circuitry for a signal may include a second digital signal processor.

According to a first aspect of that sixth implementation, the first digital signal processor may be configured to retime the signal.

According to a first instance of that first aspect, the first digital signal processor may further be configured to correct transmission impairments in the signal.

According to a second aspect of that sixth implementation, the second digital signal processor may be configured to retime the signal.

According to a first instance of that second aspect, the second digital signal processor may further be configured to correct transmission impairments in the signal.

In accordance with implementations of the subject matter of this disclosure, a method of transporting a signal in an active cable includes performing, at a first end of the active cable, one of (a) linear driving of the signal for transmission to a second end of the active cable, and (b) non-linear driving of the signal for transmission to the second end of the active cable, performing, at the first end of the active cable, one of (c) linear processing of the signal as received from the second end of the active cable, and (d) non-linear processing of the signal as received from the second end of the active cable, performing, at the second end of the active cable, (e) the linear driving of the signal for transmission when the non-linear processing is performed at the first end of the active cable, and (f) the non-linear driving of the signal for transmission when the linear processing is performed at the first end of the active cable, and performing, at the second end of the active cable, (g) the linear processing of the signal as received when the non-linear driving is performed at the first end of the active cable, and (h) the non-linear processing of the signal as received when the linear driving is performed at the first end of the active cable.

In a first implementation of such a method, performing the linear driving of the signal may further include performing continuous time linear equalization of the signal.

A second implementation of such a method may include transporting an electrical signal in an active electrical cable.

A third implementation of such a method may include transporting an optical signal in an active optical cable.

According to a first aspect of that third implementation, performing the linear driving of the signal may further include transmitting the optical signal with any one of (a) a vertical-cavity surface-emitting laser (VCSEL) driver, (b) an electro-absorption modulated laser (EML) driver, (c) a directly modulated laser (DML) driver, (d) a silicon photonics (SiPho) driver, (e) a micro-ring resonator, and (f) a micro LED driver.

According to a second aspect of that third implementation, performing the linear processing of the signal as received may further include amplifying, using a high-swing transimpedance amplifier (TIA), the optical signal.

In a fourth implementation of such a method, performing the linear driving of the signal may further include encoding the signal using non-return-to-zero (NRZ) modulation encoding.

In a fifth implementation of such a method, performing the linear driving of the signal may further include encoding the signal using pulse amplitude modulation (PAM) modulation encoding.

In a sixth implementation of such a method, performing the linear processing of the signal as received may include performing continuous time linear equalization of the signal.

In a seventh implementation of such a method, performing the non-linear driving of the signal for transmission may include performing digital signal processing of the signal for transmission.

According to a first aspect of that seventh implementation, performing digital signal processing may include retiming the signal, and correcting transmission impairments of the signal.

In an eighth implementation of such a method, performing the non-linear processing of the signal as received may include performing digital signal processing of the signal as received.

According to a first aspect of that eighth implementation, performing digital signal processing may include retiming the signal, and correcting transmission impairments of the optical signal.

BRIEF DESCRIPTION OF THE DRAWINGS

Further features of the disclosure, its nature, and various advantages, will be apparent upon consideration of the following detailed description, taken in conjunction with the accompanying drawings, in which like reference characters refer to like parts throughout, and in which.

DETAILED DESCRIPTION

Figure 1:
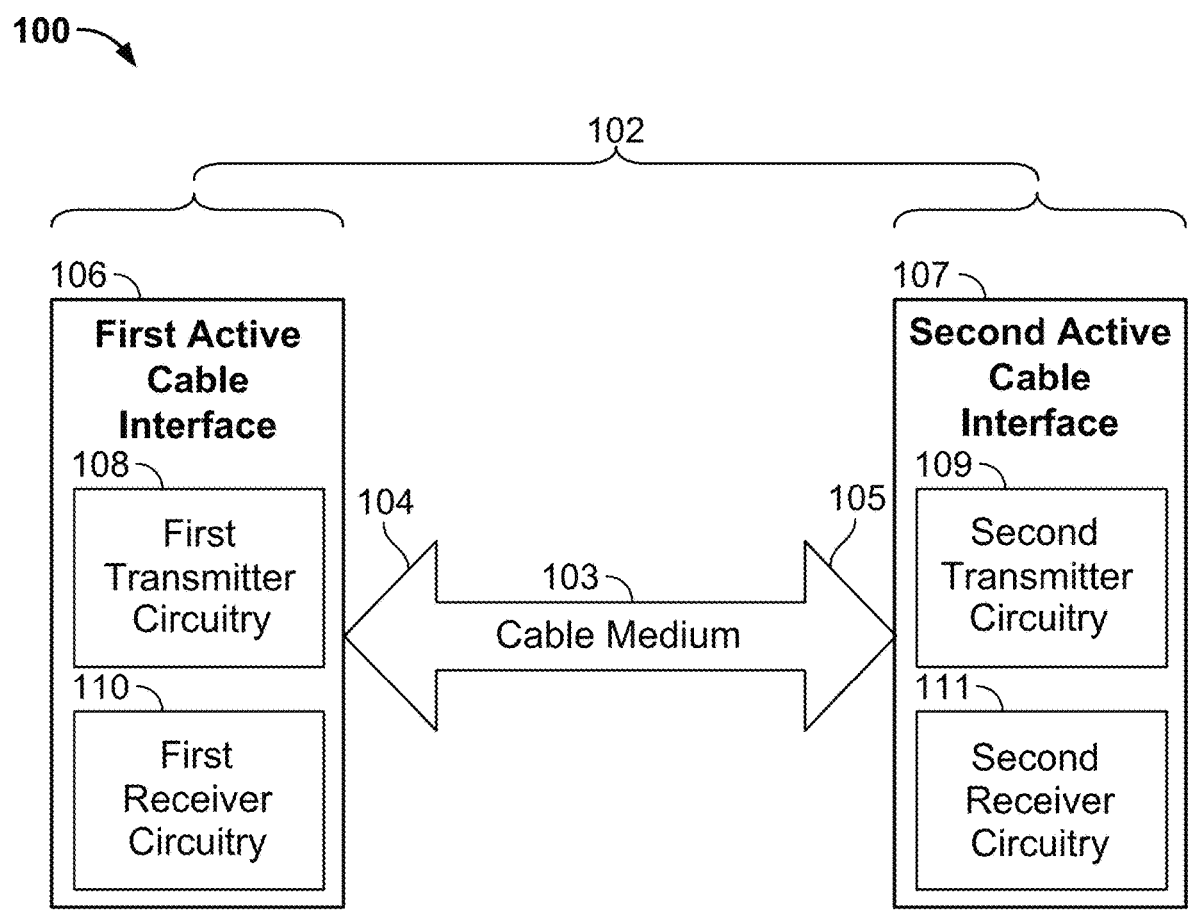
FIG. 1 is a block diagram of an active cable including interface circuitry according to the subject matter of this disclosure.

In signal communications, signals may be transmitted over a cable medium such as a fiber-optic cable between two serializer/deserializer (SERDES) devices, each of which may be, e.g., an Ethernet physical layer transceiver (PHY) device or a port of a network switch. The signal may be subject to transmission impairments, which may include, e.g., crosstalk (caused by signal interference from another signal) and/or jitter (any deviation or displacement of the signal). In the case of optical communications, other transmission impairments may include optical impairments of optical signals such as polarization-dependent loss (PDL), and chromatic dispersion (CD). PDL may occur as a result of depolarization of optical signals due to the optical fiber structure of an active optical cable (AOC). CD may arise from the variation in propagation velocity of optical signals with different wavelengths. A sharp optical signal may thus be dispersed and may begin to overlap with adjacent signals resulting in degraded signal quality.

Non-linear operations performed on a signal may be performed by a digital signal processor to retime and correct the signal for transmission onto a cable medium (e.g., optical fiber or multi-core electrical cable) or for processing after the receipt of a signal from of the cable medium. Non-linear operations may include retiming of the signal, correcting of the signal and performing continuous time linear equalization of the signal. Otherwise, the interface circuitry may perform linear operations on signals, where the linear operations do not typically include performing retiming and correcting of the signal. In some implementations, linear operations include basic operations of a signal driver or operations of a signal receiver for directly driving or receiving a signal from the cable medium, respectively. The PHY device or the port of the network switch typically includes interface circuitry that may perform non-linear operations to correct transmission impairments at either the transmit end or the receive end or both.

To reduce power consumption and/or cost of the PHY device or the port of the network switch, some or all of the interface circuitry may be moved out of the PHY device or the port of the network switch into terminations of an active cable. However, including non-linear interface circuitry at both ends of the active cable may itself give rise to unnecessary cost and/or power consumption.

Therefore, in accordance with implementations of the subject matter of this disclosure, interface circuitry may be provided for the two ends of an active cable. The interface circuitry for each end includes driver (i.e., transmitter) circuitry and processing (i.e., receiver) circuitry. To reduce cost and power consumption, for each direction of data transport, non-linear processing may be performed at only one end of the active cable, while at the other end of the active cable, only linear processing may be performed.

Accordingly, a set of interfaces for an active cable may include:

1. One interface for a first end of the active cable, including linear driving circuitry and linear receiving circuitry, and one interface for a second end of the active cable, including non-linear driving circuitry and non-linear receiving circuitry; or
2. One interface for a first end of the active cable and one interface for a second end of the active cable, each interface including linear driving circuitry and non-linear receiving circuitry; or
3. One interface for a first end of the active cable and one interface for a second end of the active cable, each interface including non-linear driving circuitry and linear receiving circuitry.

In some implementations, the first active cable interface includes linear driving circuitry for a signal and non-linear receiver circuitry for a signal, and the second active cable interface includes linear driving circuitry for a signal and non-linear receiving circuitry for a signal. In some implementations, the first active cable interface includes non-linear driving circuitry for a signal and linear receiving circuitry for a signal, and the second active cable interface includes linear receiving circuitry for a signal and non-linear driving circuitry for a signal. In some implementations, the first active cable interface includes linear driving circuitry for a signal and linear receiving circuitry for a signal, and the second active cable interface includes non-linear receiving circuitry for a signal and non-linear driving circuitry for a signal. Because the active cable is symmetrical, it does not matter for purposes of this implementation which end of the active cable is considered to house the first interface and which end of the active cable is considered to house the second interface.

In some implementations, the subject matter of this disclosure may be implemented with fixed connections (i.e., non-pluggable couplings) to the SERDES devices (e.g., PHYs or network switches). For example, such an implementation may be seen where co-packaged optics (CPO) are used within each of the SERDES devices.

In some implementations, the linear driving circuitry for a signal may include a continuous time linear equalizer (CTLE), which is used as a linear filter to compensate for channel attenuation. As just two examples, a CTLE may attenuate low-frequency signal portions and filter out higher frequency distortions, or may amplify the high-frequency signal portions without attenuating the low-frequency signal portions. in some cases, a CTLE may be implemented as a differential amplifier with a fixed or programmable frequency dependent degeneration feature. In one example, a programmable frequency dependent degeneration feature is programmed by adjusting one or more resistance and/or capacitance values in the differential amplifier. These resistance and capacitance values may also define a "roll up point" which is the minimum frequency at which the differential amplifier will start to boost the output signal of the differential amplifier.

In the case of electrical communications, the linear receiving circuitry for an electrical signal includes a receiver and a CTLE to perform continuous time linear equalization of the electrical signal. The receiver is configured to receive electrical signals transported over the active cable (e.g., an active electrical cable). The receiver may include a decoder to convert electrical signals into a signal format on which processors of network node devices (e.g., a PHY or network switch) may operate.

In the case of optical communications, the linear receiving circuitry for an optical signal includes a photodiode receiver and a high-swing transimpedance amplifier (TIA). The photodiode receiver is configured to receive optical signals transported over the active cable (i.e., an active optical cable). The TIA may be used to amplify the received optical signals from the photodiode receiver and convert optical current signals into voltage signals on which processors of network node devices (e.g., network switch) may operate. The linear receiving circuitry for an optical signal may include a continuous time linear equalizer (CTLE).

Each of the non-linear driving circuitry and the non-linear receiving circuitry may include a digital signal processor. Each digital signal processor is capable of re-timing the signal, whether prior to transmission onto the active cable from the non-linear driving circuitry or after receipt from the active cable at the non-linear receiving circuitry. Each digital signal processor may include clock data recovery (CDR) circuitry, which is capable of re-timing the signal.

In addition, the non-linear receiving circuitry may be configured to remove jitter incurred inherited from a high bandwidth communications network. The digital signal processor is configured to correct the signals of transmission impairments incurred during transportation over the active cable.

An active cable may be considered to have two channels—one channel that transports signals from a first end to a second end, and another channel that transports signals from the second end to the first end. For each channel, there should be at least one of non-linear driving circuitry for the signal or non-linear receiving circuitry for the signal, to re-time and correct the signal. It does not matter whether the correction is at the transmit end or the receive end of the particular channel. This guarantees that each communication direction of the active cable will include re-timing, or correction of any transmission impairment, in order to improve link reliability and signal quality, and to reduce signal loss over the cable medium of the active cable.

In some implementations, the active cable may be an active optical cable, which includes single-mode optical fiber, which may be used for long range optical signal communication by using one of an electro-absorption modulated laser driver, a directly modulated laser (DML) driver, and a silicon photonics (SiPho) driver. In some implementations, the active optical cable may include multi-mode optical fiber, which may be used for short range optical signal communications with any one of a vertical-cavity surface-emitting laser (VCSEL) driver, a micro-ring resonator, or a micro light-emitting diode (LED) driver. In some implementations of the present disclosure, the active optical cable communications network may be implemented for high bandwidth applications such as artificial intelligence or machine learning processing.

In addition, the linear driving circuitry for an optical signal may include an optical signal driver such as (a) a vertical-cavity surface-emitting laser (VCSEL) driver, (b) an electro-absorption modulated laser (EML) driver, (c) a directly modulated laser (DML) driver, (d) a silicon photonics (SiPho) driver, (e) a micro-ring resonator, or (f) a micro LED driver. The optical transmitter circuitry may be configured to encode optical signals using non-return-to-zero (NRZ) encoding, pulse-amplitude modulation (PAM) encoding, or any other suitable encoding format for optical signals. When transmitter circuitry at one end of an optical channel (i.e., in a first active optical cable interface) includes an encoder, receiver circuitry at the other end of that channel (i.e., in a second active optical cable interface) should include a corresponding decoder (e.g., both should be NRZ, or both should be PAM) to decode the received signals. Linear driving circuitry may be configured to directly drive optical signals onto the cable medium of the active optical cable. The linear receiving circuitry may be configured to couple data signals directly from the optical medium to the respective device (e.g., a PHY or network switch) that is communicatively coupled to the respective active optical cable interface.

The subject matter of this disclosure may be better understood by reference to FIGS. 1-8.

FIG. 1 is a block diagram of an active cable 100 including interface circuitry 102, in accordance with implementations of the subject matter of this disclosure. active cable 100 includes a cable medium 103 (e.g., an active optical cable or active electrical cable). Interface circuitry 102 may include a first active cable interface 106 coupled to the first end 104 of cable medium 103, and a second active cable interface 107 coupled to the second end 105 of cable medium 103. First active cable interface 106 may include first transmitter circuitry 108 and first receiver circuitry 110, and second active cable interface 107 may include second transmitter circuitry 109 and second receiver circuitry 111. Each of first transmitter circuitry 108 and the second transmitter circuitry 109 is configured to transmit a signal (e.g., an optical signal or an electrical signal) onto cable medium 103. Each of first receiver circuitry 110 and second receiver circuitry 111 is configured to receive a signal from cable medium 103.

To reduce cost and power consumption of active cable 100, for each channel—i.e., each direction of data transport—non-linear processing or driving may be performed at only one end of active cable 100, while at the other end of active cable 100, linear processing or driving may be performed. This ensures that for each direction of data transport (i.e., from first active cable interface 106 to second active cable interface 107, and from second active cable interface 107 to first active cable interface 106), the retiming and correcting of a signal occurs on only one end of active cable 100.

Interface circuitry 102 may include different configurations of active cable interfaces 106, 107, as described below in connection with FIGS. 2-4.

As noted above, each end 104, 105 of active cable 100 may be configured for coupling to a respective network node device (e.g., a PHY or a port of a network switch) including a serializer/deserializer (SERDES) to transmit and receive signals serially to the interface circuitry 102. In some implementations of a network switch, the SERDES of the network device may be included in a network port of the network switch. The first transmitter circuitry 108 is configured to transmit a signal, which is received by the second receiver circuitry 111. The second transmitter circuitry 109 is configured to transmit a signal, which is received by the first receiver circuitry 110. Each of the first transmitter circuitry 108, second transmitter circuitry 109, second receiver circuitry 110, and second receiver circuitry 111 may include a processing unit or any suitable processing unit, such as a processing core to drive or process the signal for transmission or for receipt. As discussed below, in some configurations, first transmitter circuitry 108 or second transmitter circuitry 109, and first receiver circuitry 110 or second receiver circuitry 111) may be non-linear driving circuitry or non-linear receiving circuitry, respectively. The non-linear driving circuitry or non-linear receiving circuitry may include a digital signal processor to retime and correct the signal for transmission onto the cable medium 103 or for processing after the receipt of a signal from the cable medium 103.

Figure 2:
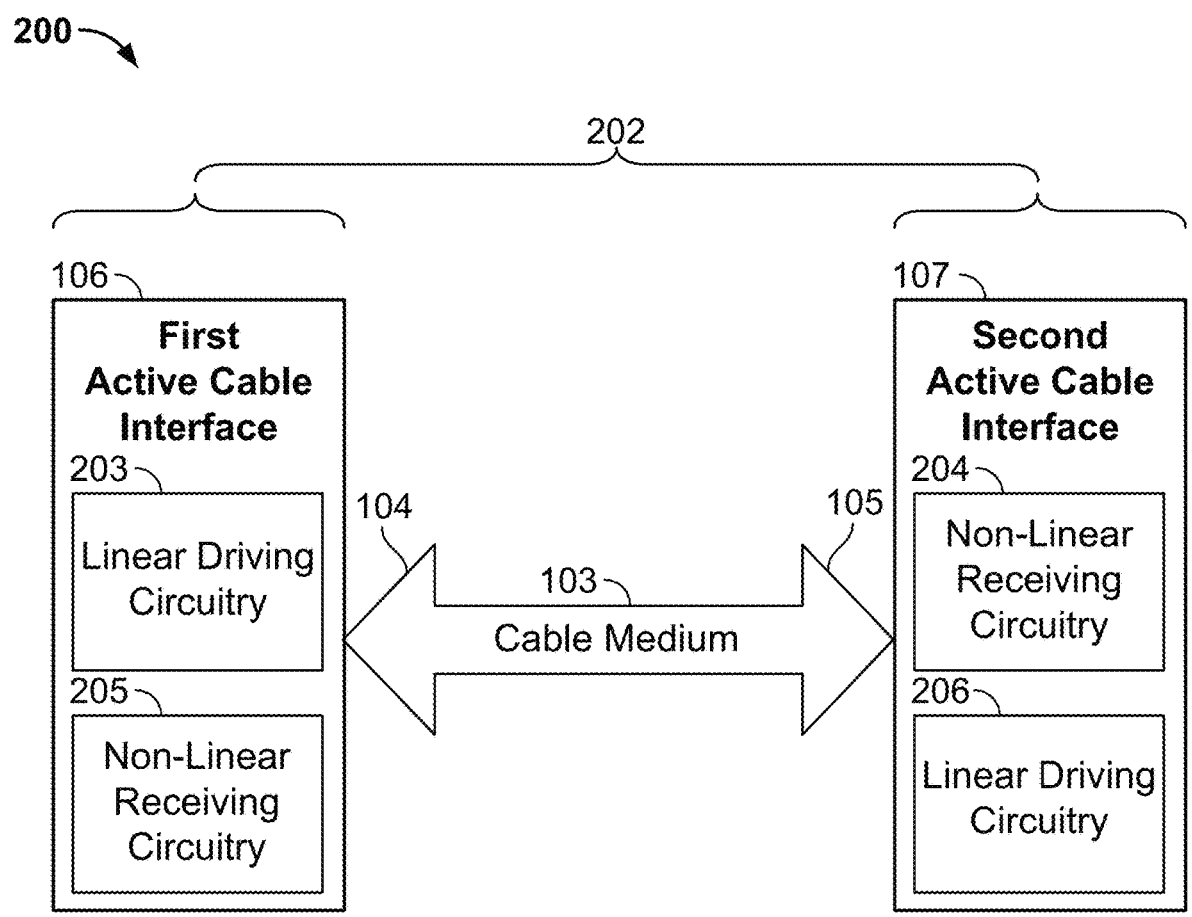
FIG. 2 is a block diagram of an active cable incorporating a first implementation of interface circuitry according to the subject matter of this disclosure.
Figure 3:
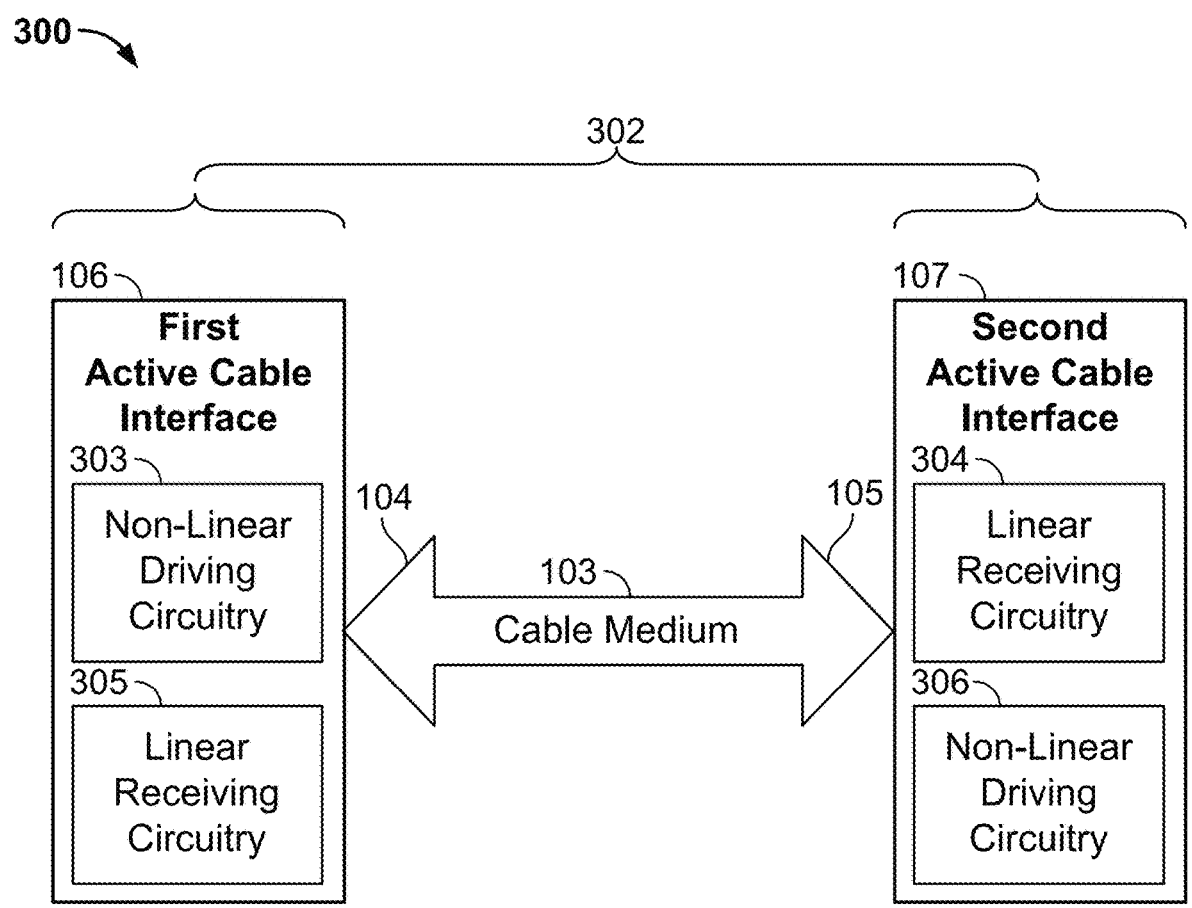
FIG. 3 is a block diagram of an active cable incorporating a second implementation of interface circuitry according to the subject matter of this disclosure.
Figure 4:
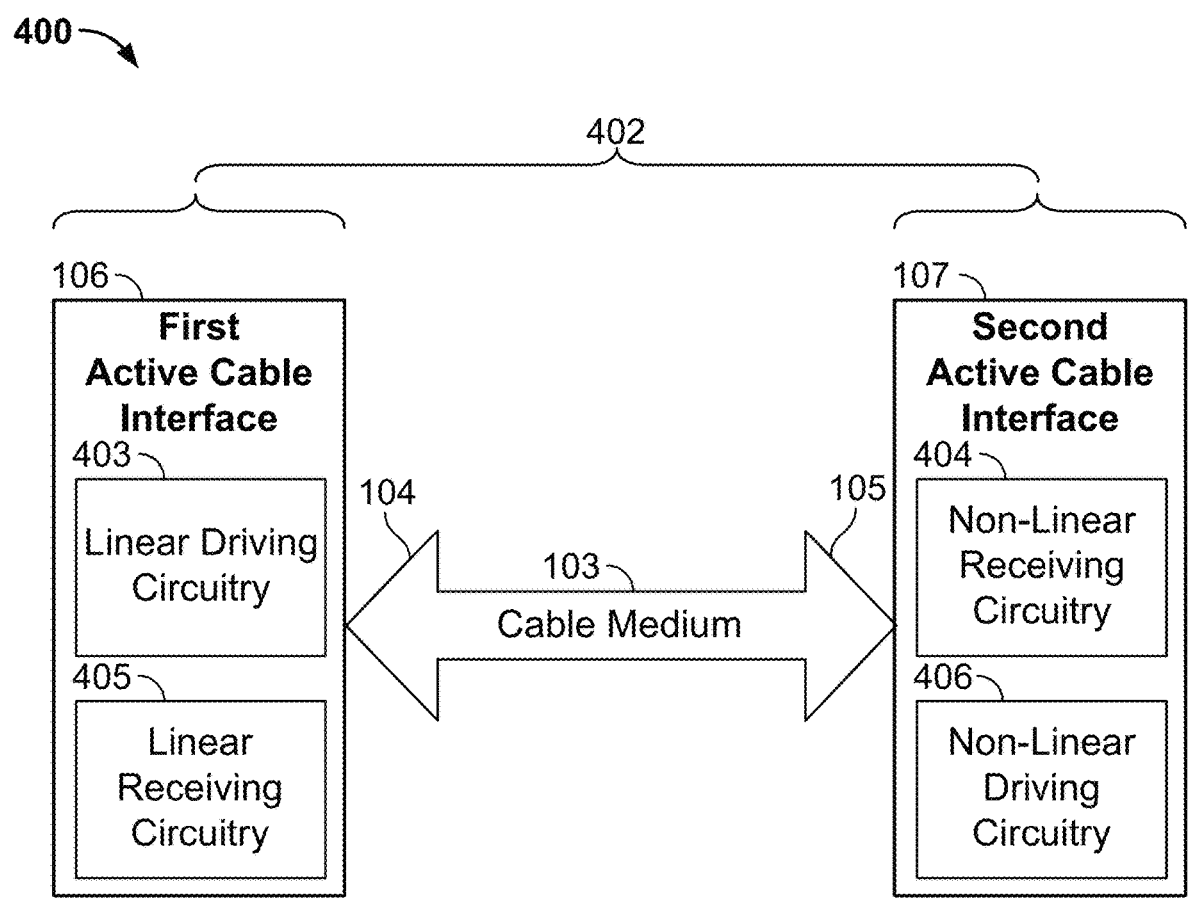
FIG. 4 is a block diagram of an active cable incorporating a third implementation of interface circuitry according to the subject matter of this disclosure.

Each of FIGS. 2, 3 and 4 is a respective block diagrams of a respective configuration (202, 302, 402) of interface circuitry 102 according to the subject matter of this disclosure.

FIG. 2 shows a configuration 200 of interface circuitry 102, including first active cable interface 106 which includes linear driving circuitry 203 for a signal and non-linear receiving circuitry 205 for a signal, and second active cable interface 107 which includes non-linear receiving circuitry 204 for a signal and linear driving circuitry 206 for a signal. Each of the linear driving circuitry 203 and the linear driving circuitry 206 may include a CTLE and a signal driver, may be configured to directly drive signals onto cable medium 103 of active cable 200. Additionally, each of non-linear receiving circuitry 205 and non-linear receiving circuitry 204 may include a digital signal processor, which may re-time and correct signals as received from cable medium 103. In some implementations, the digital signal processor may include clock data recovery (CDR) circuitry, which is capable of re-timing the signal after receipt from cable medium 103 or before transmission onto cable medium 103. Additionally, the non-linear receiving circuitry 204 may be configured to remove jitter, such as that which may, in the case of optical communications, be inherited from a high bandwidth optical communications network.

FIG. 3 shows a configuration 300 of interface circuitry 102. In this configuration 300, the first active cable interface 106 which includes non-linear driving circuitry 303 for a signal and linear receiving circuitry 305 for a signal, and the second active cable interface 107 which includes linear receiving circuitry 304 and non-linear driving circuitry 306. In some implementations of an active optical cable, each of the linear receiving circuitry 305 and the linear receiving circuitry 304 may include a photodetector, a high-swing TIA, and a CTLE, and may be configured to directly drive data signals to a respective network switch that is communicatively coupled to the first active cable interface 106 and the second active cable interface 107, respectively. The photodetector and the TIA would not be needed for an electrical signal. Additionally, each of non-linear driving circuitry 303 and non-linear driving circuitry 306 includes a digital signal processor, which may re-time and correct signals for transmission from cable medium 103 of the active cable 300.

FIG. 4 shows a configuration 400 of interface circuitry 102. In this configuration 400, first active cable interface 106 includes linear driving circuitry 403 for a signal and linear receiving circuitry 405 for a signal, and second active cable interface 107 includes non-linear receiving circuitry 404 for a signal and non-linear driving circuitry 406 for a signal. Linear driving circuitry 403 may include a CTLE and a signal driver. Non-linear receiving circuitry 404 may include a digital signal processor, which may re-time and correct the signal as received from cable medium 103. Linear receiver circuitry 405 of an active optical cable transporting optical signals may include a photodetector, a high-swing TIA, and a CTLE. The photodetector and the TIA would not be needed for an electrical signal. Non-linear driving circuitry 406 may include a digital signal processor, which may re-time and correct optical signals for transmission onto cable medium 103.

Any one of linear driving circuitry 203, 206, and 403 and non-linear driving circuitry 303, 306, and 406 may be configured for different types of active optical cables, such as a single-mode optical fiber network (e.g., EML, DML, or SiPho) or a multi-mode fiber optic network (e.g., VCSEL, micro-ring resonator, or micro LED). Similarly, the photo-detector (not shown) of linear receiving circuitry 304, 305, and 405 and non-linear receiving circuitry 204, 205, and 404) for an active optical cable may be configured to receive optical signals for a single-mode optical fiber network (e.g., EML, DML, or SiPho) or a multi-mode fiber optic network (e.g., VCSEL, micro-ring resonator, or micro LED).

First transmitter circuitry 108 or second transmitter circuitry 109, however implemented, may include an encoder to encode the signals in non-return-to-zero (NRZ) encoding format, pulse-amplitude modulation (PAM) encoding format or any other suitable encoding format for the signals (e.g., optical signals or electrical signals). When transmitter circuitry 108 or 109 includes an encoder, receiver circuitry 111 or 110, respectively, should include a corresponding decoder to decode the received encoded signals. Therefore, for example, if the first transmitter circuitry 108 includes an NRZ encoder, the second receiver circuitry 111 includes an NRZ decoder. Additionally, if the first transmitter circuitry 108 includes a PAM encoder, the second receiver circuitry 111 includes a PAM decoder.

Figure 5:
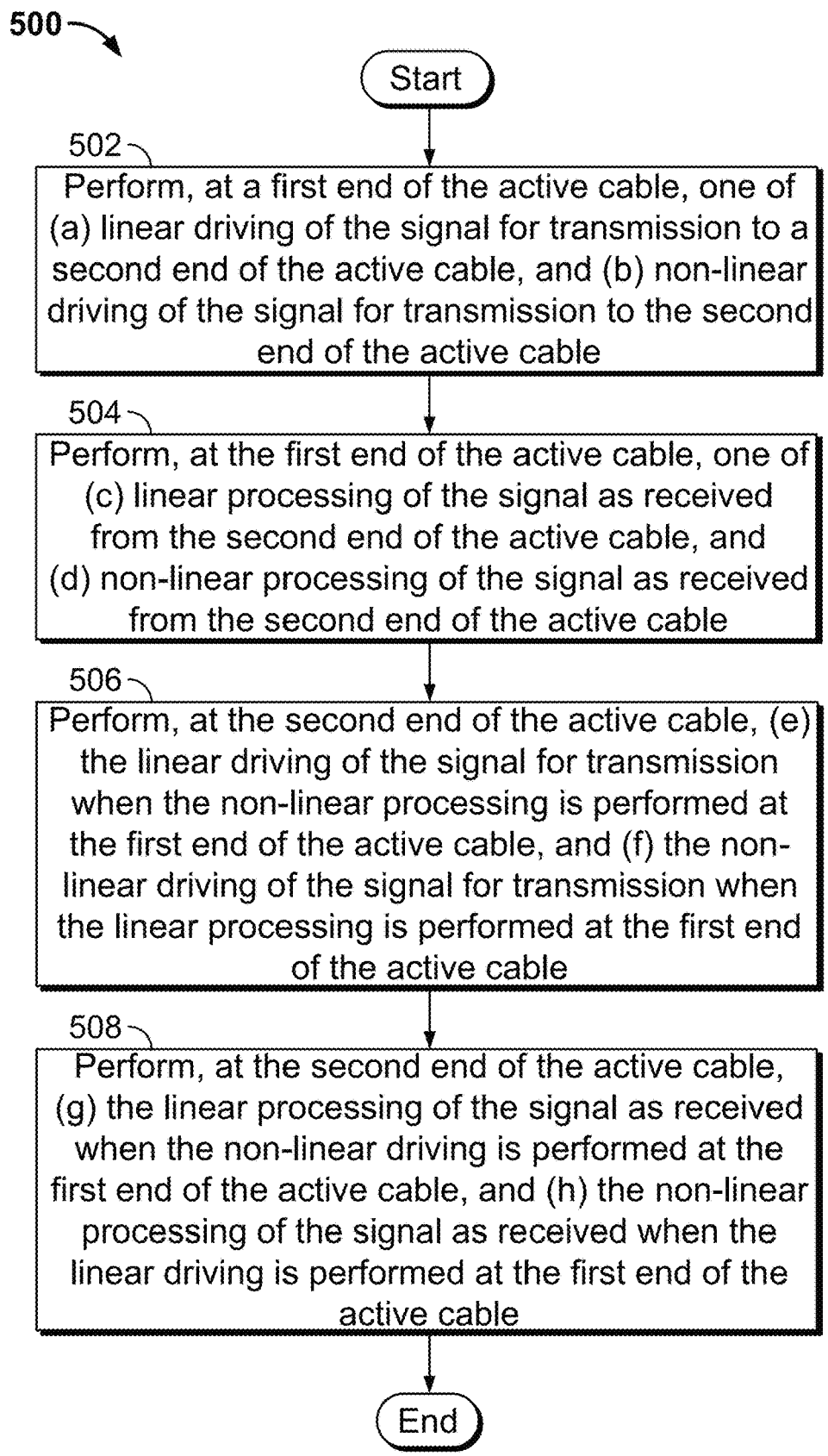
FIG. 5 is a flow diagram illustrating a method of transporting a signal in an active cable, according to implementations of the subject matter of this disclosure.

A method 500, in accordance with implementations of the subject matter of this disclosure, is diagrammed in FIG. 5. Method 500 begins at 502, where one of (a) linear driving of the signal for transmission to a second end of the active cable, and (b) non-linear driving of the signal for transmission to the second end of the active cable, is performed at a first end of the active cable. At 504, one of (c) linear processing of the signal as received from the second end of the active cable, and (d) non-linear processing of the signal as received from the second end of the active cable, is performed at the first end of the active cable. At 506, (e) linear driving of the signal for transmission is performed at the second end of the active cable when the non-linear processing is performed at the first end of the active cable, and (f) non-linear driving of the signal for transmission is performed at the second end of the active cable when the linear processing is performed at the first end of the active cable. At 508, (g) linear processing of the signal as received is performed at the second end of the active cable when the non-linear driving is performed at the first end of the active cable, and (h) non-linear processing of the signal as received is performed at the second end of the active cable when the linear driving is performed at the first end of the active cable.

Figure 6:
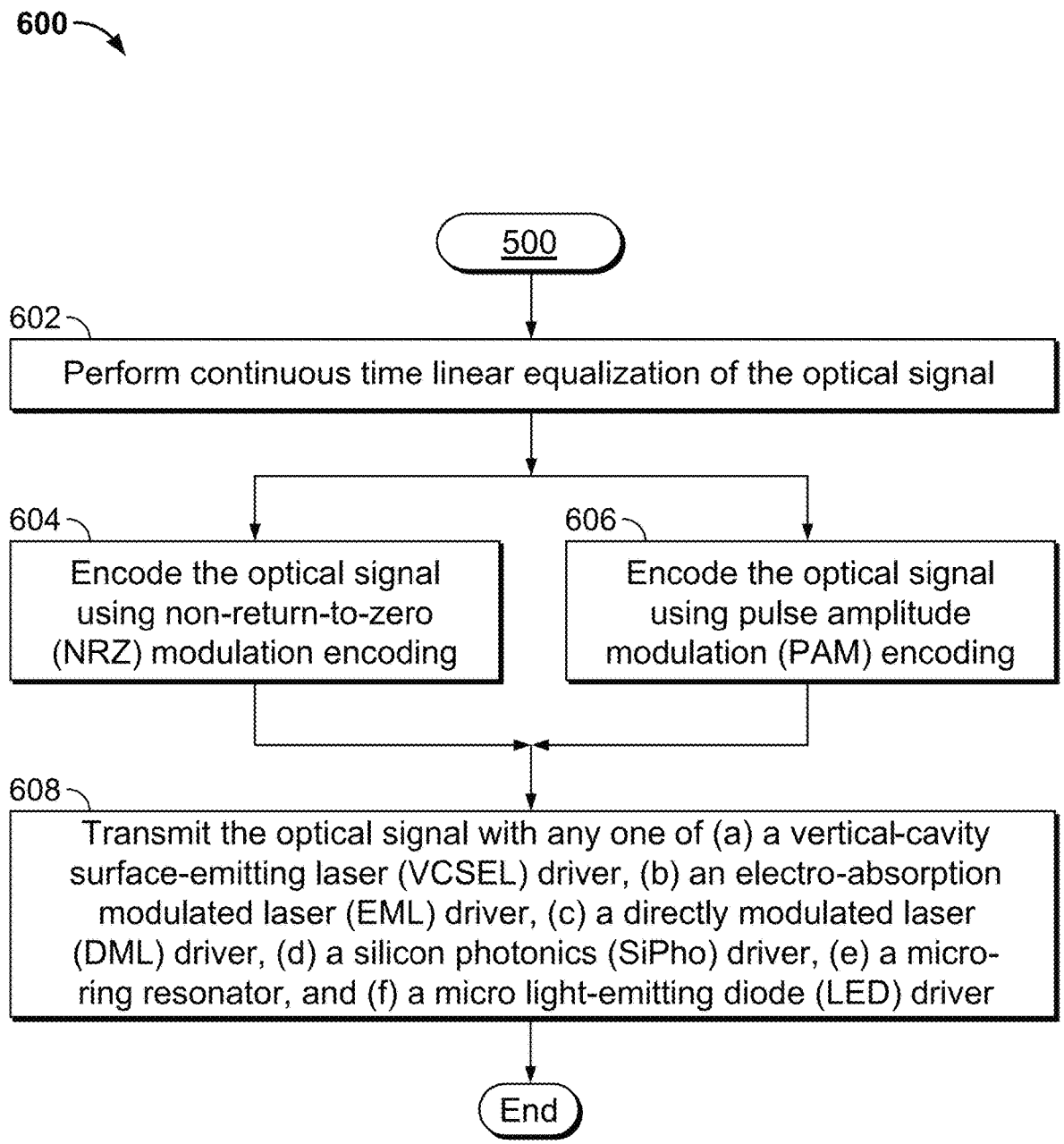
FIG. 6 is a flow diagram illustrating a method for linear driving of an optical signal for transmission, according to implementations of the subject matter of this disclosure.

A method 600, for linear driving of the optical signal for transmission in accordance with implementations of the subject matter of this disclosure, is diagrammed in FIG. 6. In some implementations, method 600 may be initiated after method 500. Method 600 begins at 602, where continuous time linear equalization of the optical signal is performed. The optical signal is then encoded at 604 or at 606, depending on the modulation encoding format. At 604, the optical signal is encoded using non-return-to-zero (NRZ) modulation encoding. At 606, the optical signal is encoded using pulse amplitude modulation (PAM) encoding. At 608, the optical signal is transmitted with any one of (a) a vertical-cavity surface-emitting laser (VCSEL) driver, (b) an electro-absorption modulated laser (EML) driver, (c) a directly modulated laser (DML) driver, (d) a silicon photonics (Si-Pho) driver, (e) a micro-ring resonator, or (f) a micro LED driver. In some implementation, continuous time linear equalization is applied to optical signals for transmission prior to the linear driving of the optical signals or applied to optical signals as received after receipt during linear processing of the optical signals. Continuous time linear equalization may be implemented by attenuating low-frequency signal portions and filtering of higher frequency distortions of the optical signals. In some implementations, when the optical signals are encoded for transmission on the active cable, the optical signals are then decoded when received by an active cable interface. The format type for decoding the optical signal during the linear or non-linear processing of the optical signal should correspond to the format type for encoding the optical signal during the linear or non-linear driving of the optical signal.

In electrical (i.e., non-optical) implementations of method 600, continuous time linear equalization, at 602, is performed. In such implementations, the electrical signal is then encoded at 604 or at 606, would similarly be performed. Transmission at 608 would be electrical, rather than using one of the laser transmission modes described above.

Figure 7:
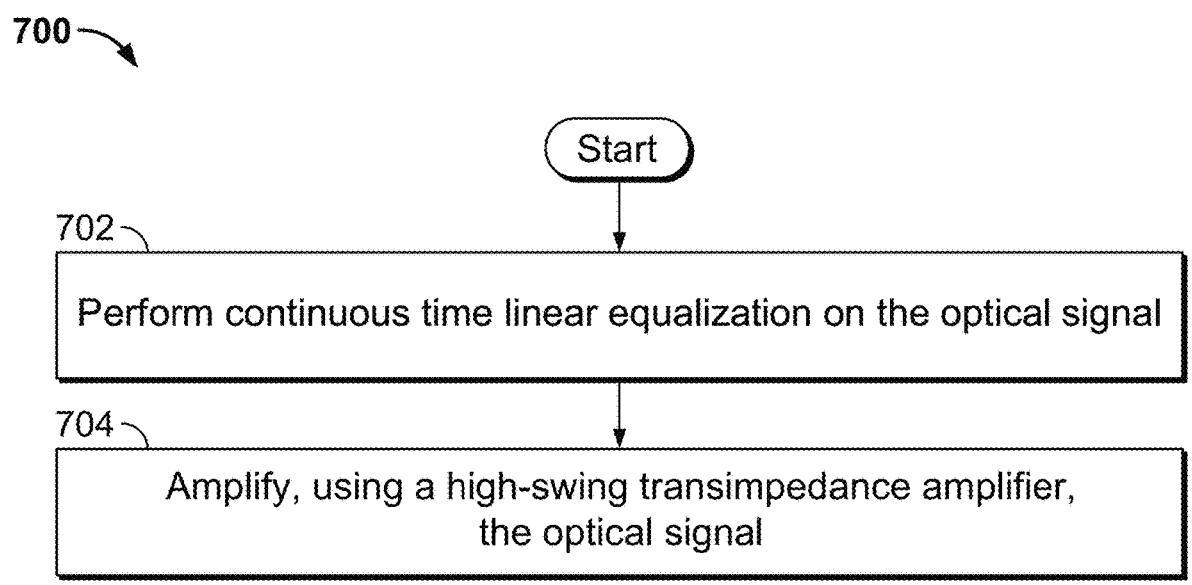
FIG. 7 is a flow diagram illustrating a method for linear processing of an optical signal as received, according to implementations of the subject matter of this disclosure.

FIG. 7 is a flow diagram illustrating a method 700 for linear processing of an optical signal as received, according to implementations of the subject matter of this disclosure. Method 700 begins at 702, where continuous time linear equalization of the optical signal is performed. At 704, the optical signal is amplified using a high-swing TIA. In an implementation for electrical signals using an active electrical cable, the linear processing of the signal as received would be performed at 702, but amplification at 704 would not be needed.

Figure 8:
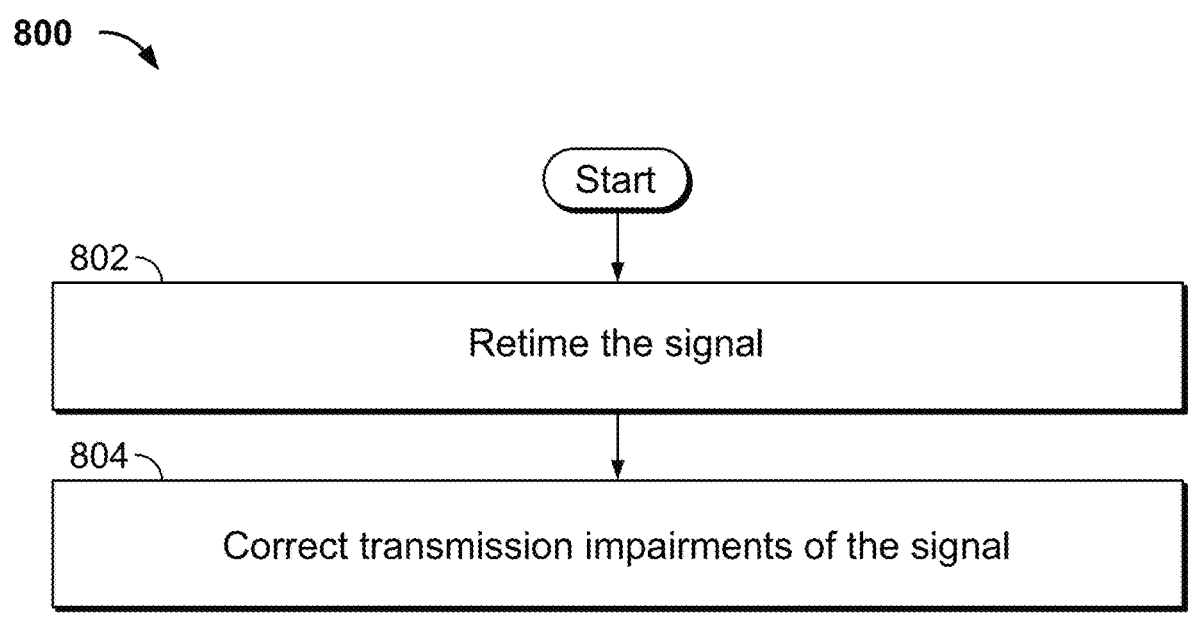
FIG. 8 is a flow diagram illustrating a method for performing digital signal processing according to implementations of the subject matter of this disclosure.

A method 800, in accordance with both optical and electrical implementations of the subject matter of this disclosure, for performing digital signal processing, is shown in FIG. 8. At 802, the signal is retimed. At 804, transmission impairments of the signal are corrected. In some implementations, these operations be performed by digital signal processing. In some implementations, retiming the signal may include performing clock data recovery. In some implementations, correcting transmission impairments may include removing jitter.

Thus it is seen interface circuitry and related methods for transporting a signal via an active cable with hybrid linear and non-linear driving, have been provided.

As used herein and in the claims, which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. Interface circuitry for an active cable, the interface circuitry comprising:
 a first active cable interface configured for coupling to a first end of the active cable, and a second active cable interface configured for coupling to a second end of the active cable, the first active cable interface including:
  first transmitter circuitry including one of (a) linear driving circuitry for a signal, and (b) non-linear driving circuitry for a signal, and
  first receiver circuitry including one of (c) linear receiving circuitry for a signal, and (d) non-linear receiving circuitry for a signal; and
 the second active cable interface including:
  second transmitter circuitry including (a) the linear driving circuitry for a signal when the first receiver circuitry includes the non-linear receiving circuitry, and (b) the non-linear driving circuitry for a signal when the first receiver circuitry includes the linear receiving circuitry, and second receiver circuitry including (c) the linear receiving circuitry for a signal when the first transmitter circuitry includes the non-linear driving circuitry, and (d) the non-linear receiving circuitry for a signal when the first transmitter circuitry includes the linear driving circuitry.

2. The interface circuitry of claim 1, wherein the linear driving circuitry for a signal comprises a continuous time linear equalizer (CTLE) to perform continuous time linear equalization of the signal.

3. The interface circuitry of claim 1, wherein the signal is an electrical signal, and the active cable is an active electrical cable.

4. The interface circuitry of claim 1, wherein the signal is an optical signal, and the active cable is an active optical cable.

5. The interface circuitry of claim 4, wherein the linear driving circuitry for the signal comprises any one of (a) a vertical-cavity surface-emitting laser (VCSEL) driver, (b) an electro-absorption modulated laser (EML) driver, (c) a directly modulated laser (DML) driver, (d) a silicon photonics (SiPho) driver, (e) a micro-ring resonator, and (f) a micro light-emitting diode (LED) driver.

6. The interface circuitry of claim 4, wherein the linear receiver circuitry for a signal comprises a high-swing transimpedance amplifier (TIA) to amplify the optical signal.

7. The interface circuitry of claim 1, wherein the linear driving circuitry for a signal is configured to encode signals using one of (a) non-return-to-zero (NRZ) encoding and (b) pulse amplitude modulation (PAM) encoding.

8. The interface circuitry of claim 1, wherein the linear receiver circuitry for a signal comprises a continuous time linear equalizer (CTLE) to perform continuous time linear equalization of the signal.

9. The interface circuitry of claim 1, wherein:
the non-linear driving circuitry for a signal comprises a first digital signal processor; and
the non-linear receiving circuitry for a signal comprises a second digital signal processor.

10. The interface circuitry of claim 9, wherein the first digital signal processor is configured to retime the signal.

11. The interface circuitry of claim 10, wherein the first digital signal processor is further configured to correct transmission impairments in the signal.

12. The interface circuitry of claim 9, wherein the second digital signal processor is configured to retime the signal.

13. The interface circuitry of claim 12, wherein the second digital signal processor is further configured to correct transmission impairments in the signal.

14. A method of transporting a signal in an active cable, the method comprising:
performing, at a first end of the active cable, one of (a) linear driving of the signal for transmission to a second end of the active cable, and (b) non-linear driving of the signal for transmission to the second end of the active cable;
performing, at the first end of the active cable, one of (c) linear processing of the signal as received from the second end of the active cable, and (d) non-linear processing of the signal as received from the second end of the active cable;
performing, at the second end of the active cable, (e) the linear driving of the signal for transmission when the non-linear processing is performed at the first end of the active cable, and (f) the non-linear driving of the signal for transmission when the linear processing is performed at the first end of the active cable; and
performing, at the second end of the active cable, (g) the linear processing of the signal as received when the non-linear driving is performed at the first end of the active cable, and (h) the non-linear processing of the signal as received when the linear driving is performed at the first end of the active cable.

15. The method of claim 14, wherein performing the linear driving of the signal further comprises performing continuous time linear equalization of the signal.

16. The method of claim 14, wherein transporting a signal in an active cable comprises transporting an electrical signal in an active electrical cable.

17. The method of claim 14, wherein transporting a signal in an active cable comprises transporting an optical signal in an active optical cable.

18. The method of claim 17, wherein performing the linear driving of the signal further comprises:
transmitting the optical signal with any one of (a) a vertical-cavity surface-emitting laser (VCSEL) driver, (b) an electro-absorption modulated laser (EML) driver, (c) a directly modulated laser (DML) driver, (d) a silicon photonics (SiPho) driver, (e) a micro-ring resonator, and (f) a micro LED driver.

19. The method of claim 17, wherein performing the linear processing of the signal as received further comprises amplifying, using a high-swing transimpedance amplifier (TIA), the optical signal.

20. The method of claim 14, wherein performing the linear driving of the signal further comprises encoding the signal using non-return-to-zero (NRZ) modulation encoding.

21. The method of claim 14, wherein performing the linear driving of the signal further comprises encoding the signal using pulse amplitude modulation (PAM) modulation encoding.

22. The method of claim 14, wherein performing the linear processing of the signal as received comprises performing continuous time linear equalization of the signal.

23. The method of claim 14, wherein performing the non-linear driving of the signal for transmission comprises performing digital signal processing of the signal for transmission.

24. The method of claim 23, wherein performing digital signal processing comprises:
retiming the signal; and
correcting transmission impairments of the signal.

25. The method of claim 14, wherein performing the non-linear processing of the signal as received comprises performing digital signal processing of the signal as received.

26. The method of claim 25, wherein performing digital signal processing comprises:
retiming the signal; and
correcting transmission impairments of the signal.

* * * * *